(12) United States Patent
Wang et al.

(10) Patent No.: US 11,149,112 B2
(45) Date of Patent: *Oct. 19, 2021

(54) BIODEGRADABLE POLYESTER AND USE THEREOF

(71) Applicant: KINGFA SCI. & TECH. CO., LTD., Guangdong (CN)

(72) Inventors: Weiwei Wang, Guangdong (CN); Zhimin Yuan, Guangdong (CN); Tongmin Cai, Guangdong (CN); Xianbo Huang, Guangdong (CN); Xiangbin Zeng, Guangdong (CN); Nanbiao Ye, Guangdong (CN); Zhilong Guo, Guangdong (CN); Changli Lu, Guangdong (CN)

(73) Assignee: KINGFA SCI. & TECH. CO., LTD., Guangdong (CN)

( * ) Notice: Subject to any disclaimer, the term of this patent is extended or adjusted under 35 U.S.C. 154(b) by 30 days.

This patent is subject to a terminal disclaimer.

(21) Appl. No.: 16/644,504

(22) PCT Filed: Jun. 26, 2018

(86) PCT No.: PCT/CN2018/092806
§ 371 (c)(1),
(2) Date: Mar. 5, 2020

(87) PCT Pub. No.: WO2019/080526
PCT Pub. Date: May 2, 2019

(65) Prior Publication Data
US 2021/0061947 A1     Mar. 4, 2021

(30) Foreign Application Priority Data
Oct. 26, 2017 (CN) .......................... 201711014925.1

(51) Int. Cl.
*C08G 63/183* (2006.01)

(52) U.S. Cl.
CPC .................................. *C08G 63/183* (2013.01)

(58) Field of Classification Search
USPC ................ 528/196, 198, 271, 272, 274, 302
See application file for complete search history.

(56) References Cited

U.S. PATENT DOCUMENTS

| 2002/0006973 | A1* | 1/2002 | Itoh ........................ C08G 63/91 |
|---|---|---|---|
| | | | 521/48 |
| 2010/0233498 | A1* | 9/2010 | Kim ........................ B32B 27/36 |
| | | | 428/480 |
| 2011/0189414 | A1* | 8/2011 | Whitehouse ............ C08L 67/04 |
| | | | 428/35.7 |

FOREIGN PATENT DOCUMENTS

| CN | 102336896 | 2/2012 |
|---|---|---|
| CN | 102639594 | 8/2012 |
| CN | 103189414 | 7/2013 |
| CN | 104497282 | 4/2015 |
| CN | 107257814 | * 10/2017 |
| CN | 107955140 | 4/2018 |

OTHER PUBLICATIONS

Wang Weiwei et al.; CN107257814A (translation) Biodegradable Polyester Composition; Chemical Ltd Co In Ptt Whole World PTT Global Chemical PCL (Year: 2017).*
"International Search Report (Form PCT/ISA/210) of PCT/CN2018/092806," dated Aug. 31, 2018, with English translation thereof, pp. 1-6.

\* cited by examiner

*Primary Examiner* — Terressa Boykin
(74) *Attorney, Agent, or Firm* — JCIPRNET

(57) ABSTRACT

The present invention relates to a biodegradable polyester and use thereof, including components: A) acid components containing following repeating units: 50 to 58 mol % of terephthalic acid A1; 30 to 40 mol % of sebacic acid A2; and 2 to 20 mol % of an aliphatic dibasic acid A3 with a carbon chain length of 6 or less; B) butanediol. In the present invention, in the case of a high content of the terephthalic acid, the biodegradable polyester prepared by introducing an aliphatic dibasic acid unit having a carbon chain length of 6 or less can satisfy the degradation performance and rigidity and improve the tenacity of the material simultaneously.

12 Claims, No Drawings

BIODEGRADABLE POLYESTER AND USE THEREOF

CROSS-REFERENCE TO RELATED APPLICATION

This application is a 371 of international application PCT of application serial no. PCT/CN2018/092806, filed on Jun. 26, 2018, which claims the priority benefit of Chinese application no. 201711014925.1, filed on Oct. 26, 2017. The entirety of each of the above-mentioned patent applications is hereby incorporated by reference herein and made a part of this specification.

BACKGROUND

Technical Field

The present invention belongs to the field of polymer material synthesis, and in particular, relates to a biodegradable polyester and use thereof.

Description of Related Art

Biodegradable resin is widely used in various film materials, such as biodegradable bags, mulching films, plastic wraps, courier bags, etc. Poly(terephthalate-co-sebacate) resin is a copolymer of butylene sebacate and butylene terephthalate. Poly(terephthalate-co-sebacate) resin contains flexible aliphatic chains and rigid aromatic chains, thus having high tenacity and high-temperature resistance. Due to the presence of ester bonds and the content of a terephthalic acid unit in a certain range, it is also promoted to have biodegradability at the same time. It is currently one of the degradable materials that are most active in the research of biodegradable plastics and have best market application.

In order to meet the requirement of rapid biodegradation, the content of the terephthalic acid unit (T %) is usually less than 49 mol %. It can be found in use that when the content of the terephthalic acid unit of the poly(terephthalate-co-sebacate) resin is too low, the mechanical properties of the material become poor. If the content of the terephthalic acid unit (T %) is too high, the degradation performance of the material becomes worse, and at the same time, the rigidity the material becomes stronger and the tenacity becomes worse.

Therefore, it is necessary to study a biodegradable resin, while ensuring the degradation performance and rigidity of the material, the tenacity of the material is also taken into account.

SUMMARY

In order to solve the above-described technical problem, an objective of the present invention is to provide a biodegradable polyester, in the case of high content of a terephthalic acid unit, by introducing an aliphatic dibasic acid unit with a carbon chain length of 6 or less, and in the case of satisfying degradation performance and rigidity, the tenacity of the material can be improved simultaneously.

The present invention is achieved by the following technical solution.

A biodegradable polyester includes components as follows in mole percent:

A) containing repeating units of acid components as follows:
  50 to 58 mol % of terephthalic acid A1;
  30 to 40 mol % of sebacic acid A2; and
  2 to 20 mol % of an aliphatic dibasic acid A3 with a carbon chain length of 6 or less;
B) butanediol.

Preferably, the acid components A contain 51 to 56 mol % of terephthalic acid A1, 30 to 40 mol % of sebacic acid A2, and 6 to 14 mol % of the aliphatic dibasic acid A3 with the carbon chain length of 6 or less.

Preferably, the aliphatic dibasic acid A3 with the carbon chain length of 6 or less is one of or a mixture of two or more of adipic acid, glutaric acid and succinic acid.

The biodegradable polyester according to the present invention is made into a film of 25±1 μm and tested using ISO 16929 (2013) standard to determine that an biodegradation rate at 90 days is greater than 90%.

The biodegradable polyester according to the present invention is made into a film of 25±1 μm and tested using ISO 527 standard, a longitudinal elongation at break is greater than 530%, and a transverse elongation at break is greater than 800%.

The biodegradable polyester according to the present invention can be prepared by conventional methods in the art, such as by the following method: under the protection of carbon dioxide, putting sebacic acid, the aliphatic dibasic acid with the carbon chain length of 6 or less and 1,4-butanediol that are measured into a reactor, and under stirring conditions, raising the temperature to 200-210° C. and reacting for 1 hour, and then adding terephthalic acid and tetra-(2-ethylhexyl) titanate, raising the temperature to 220-230° C. and reacting for 1-2 hours, vacuumizing, reducing the pressure in the reactor to 100 Pa or less within 2 hours, and reacting at 230-260° C. for 2-4 hours, stopping stirring, filling the reactor with carbon dioxide, extruding the resin out of the reactor to pelletize to obtain the biodegradable polyester.

The present invention further provides a biodegradable polyester blend including the above-described biodegradable polyester.

According to performance requirements, other biodegradable polyesters, other processing aids, etc. may be added to the biodegradable polyester blend, and the addition amount is a conventional amount in the art.

The present invention further provides use of the biodegradable polyester or the biodegradable polyester blend described above in preparation of various film materials which are biodegradable bags, mulching films, plastic wraps, or courier bags, etc.

Compared with the prior art, the present invention has the following beneficial effects:

in the present invention, in the case of a high content of the terephthalic acid unit, by introducing the aliphatic dibasic acid unit with the carbon chain length of 6 or less, under the circumstance that the prepared biodegradable polyester satisfies the degradation performance and rigidity, the tenacity of the material can be improved simultaneously.

DESCRIPTION OF THE EMBODIMENTS

The present invention is further described below by specific implementations. The following embodiments are preferred implementations of the present invention, but the implementations of the present invention are not limited by the following embodiments.

The raw materials used in the embodiments and comparative examples are all commercially available.

Synthesis of Biodegradable Polyester:

Under the protection of carbon dioxide, as shown in Table 1, sebacic acid, an aliphatic dibasic acid with a carbon chain length of 6 or less, and 1,4-butanediol which were measured were put into the reactor, and under stirring conditions, the temperature was raised to 200-210° C. for reaction for 1 hour, and then terephthalic acid and tetra-(2-ethylhexyl) titanate were added, the temperature was raised to 220-230° C. for reaction for 1-2 hours, vacuumization was conducted, and the pressure in the reactor was reduced to 100 Pa or less within 2 hours, reaction was conducted at 230-260° C. for 2-4 hours, stirring was stopped, the reactor was filled with carbon dioxide, the resin was extruded out of the reactor to be pelletized to obtain a biodegradable polyester. An amount of sebacic acid, an amount of the aliphatic dibasic acid with the carbon chain length of 6 or less, an amount of 1,4-butanediol and an amount of terephthalic acid can be changed to obtain resins with different structures.

Property Evaluation Method:

Film tensile test method: the biodegradable polyester was made into a film of 25±1 μm, and then was tested by using ISO 527 standard.

Test method for biodegradation rate: the biodegradable polyester was made into a film of 25±1 μm, and then was tested by using ISO 16929 (2013) standard.

Test results are shown in Table 2 and Table 3.

TABLE 1

Mass of each raw material in embodiments and comparative examples

|  | sebacic acid (g) | 1,4-butanediol (g) | terephthalic acid (g) | tetra-(2-ethylhexyl) titanate (g) | adipic acid (g) | glutaric acid (g) | succinic acid (g) |
|---|---|---|---|---|---|---|---|
| Embodiment 1 | 2078.8 | 3473.6 | 2305.2 | 6.0 | 225.3 | | |
| Embodiment 2 | 1994.0 | 3507.3 | 2327.6 | 6.0 | | 274.2 | |
| Embodiment 3 | 2084.2 | 3482.5 | 2182.7 | 6.0 | 338.8 | | |
| Embodiment 4 | 1877.9 | 3586.2 | 2247.7 | 6.0 | | | 438.6 |
| Embodiment 5 | 1837.9 | 3509.8 | 2415.5 | 6.0 | 341.5 | | |
| Embodiment 6 | 1692.7 | 3535.5 | 2433.2 | 6.0 | 458.7 | | |
| Embodiment 7 | 1603.1 | 3571.7 | 2494.7 | 6.0 | 772.3 | | |
| Embodiment 8 | 2071.7 | 3461.8 | 2467.5 | 6.0 | 74.8 | | |
| Comparative Example 1 | 2356.7 | 3424.3 | 2272.5 | 6.0 | | | |
| Comparative Example 2 | 2498.9 | 3408.6 | 2136.4 | 6.0 | | | |
| Comparative Example 3 | 2261.1 | 3434.7 | 2363.8 | 6.0 | | | |

TABLE 2

Mole content of each unit of embodiments and comparative examples

|  | terephthalic acid content (mol %) | sebacic acid content (mol %) | adipic acid content (mol %) | glutaric acid content (mol %) | succinic acid content (mol %) |
|---|---|---|---|---|---|
| Embodiment 1 | 54.0 | 40.0 | 6.0 | | |
| Embodiment 2 | 54.0 | 38.0 | | 8.0 | |
| Embodiment 3 | 51.0 | 40.0 | 9.0 | | |
| Embodiment 4 | 51.0 | 35.0 | | | 14.0 |
| Embodiment 5 | 56.0 | 35.0 | 9.0 | | |
| Embodiment 6 | 56.0 | 32.0 | 12.0 | | |
| Embodiment 7 | 50.0 | 30.0 | 20.0 | | |
| Embodiment 8 | 58.0 | 40.0 | 2.0 | | |
| Comparative Example 1 | 54.0 | 46.0 | | | |
| Comparative Example 2 | 51.0 | 49.0 | | | |
| Comparative Example 3 | 56.0 | 44.0 | | | |

TABLE 3

Results of property tests of embodiments and comparative examples

|  | Biodegradation rate % | Longitudinal tensile strength/ Mpa | Transverse tensile strength/ Mpa | Longitudinal elongation at break/ % | Transverse elongation at break/ % |
|---|---|---|---|---|---|
| Embodiment 1 | 91 | 27 | 28 | 540 | 850 |
| Embodiment 2 | 91 | 28 | 29 | 550 | 860 |
| Embodiment 3 | 92 | 25 | 28 | 560 | 880 |
| Embodiment 4 | 92 | 26 | 28 | 580 | 890 |
| Embodiment 5 | 90 | 29 | 31 | 540 | 840 |
| Embodiment 6 | 90 | 30 | 30 | 550 | 850 |

TABLE 3-continued

Results of property tests of embodiments and comparative examples

|  | Biodegradation rate % | Longitudinal tensile strength/ Mpa | Transverse tensile strength/ Mpa | Longitudinal elongation at break/ % | Transverse elongation at break/ % |
| --- | --- | --- | --- | --- | --- |
| Embodiment 7 | 91 | 26 | 27 | 530 | 830 |
| Embodiment 8 | 90 | 33 | 34 | 520 | 810 |
| Comparative Example 1 | 83 | 25 | 28 | 450 | 780 |
| Comparative Example 2 | 85 | 23 | 22 | 530 | 800 |
| Comparative Example 3 | 79 | 28 | 32 | 400 | 750 |

As can be seen from the results of the embodiments and comparative examples in Table 3, in the present invention, by introducing the aliphatic dibasic acid unit with the carbon chain length of 6 or less, under the circumstance that the prepared biodegradable polyester satisfies the degradation performance and rigidity, the tenacity of the material can be improved simultaneously.

What is claimed is:

1. A biodegradable polyester, comprising components as follows in mole percent:
   A) acid components containing following repeating units:
   51 to 56 mol % of terephthalic acid A1;
   30 to 40 mol % of sebacic acid A2; and
   6 to 14 mol % of an aliphatic dibasic acid A3 with a carbon chain length of 6 or less; and
   B) butanediol.

2. The biodegradable polyester according to claim 1, wherein the aliphatic dibasic acid A3 with the carbon chain length of 6 or less is one of or a mixture of two or more of adipic acid, glutaric acid and succinic acid.

3. The biodegradable polyester according to claim 1, wherein the biodegradable polyester is made into a film of 25±1 μm and tested using ISO 16929 (2013) standard to determine that a biodegradation rate at 90 days is greater than 90%.

4. The biodegradable polyester according to claim 1, wherein the biodegradable polyester is made into a film of 25±1 μm and tested using ISO 527 standard, a longitudinal elongation at break is greater than 530%, and a transverse elongation at break is greater than 800%.

5. A biodegradable polyester blend comprising the biodegradable polyester according to claim 1.

6. A preparation method of various film materials, comprising using the biodegradable polyester according to claim 1.

7. The preparation method of the various film materials according to claim 6, wherein the various film materials are biodegradable bags, mulching films, plastic wraps, or courier bags.

8. A biodegradable polyester blend comprising the biodegradable polyester according to claim 2.

9. A biodegradable polyester blend comprising the biodegradable polyester according to claim 3.

10. A biodegradable polyester blend comprising the biodegradable polyester according to claim 4.

11. A preparation method of various film materials, comprising using the biodegradable polyester blend according to claim 5.

12. The preparation method of the various film materials according to claim 11, wherein the various film materials are biodegradable bags, mulching films, plastic wraps, or courier bags.

\* \* \* \* \*